US005277222A

United States Patent [19]

Clarke

[11] Patent Number: 5,277,222

[45] Date of Patent: Jan. 11, 1994

[54] PRESSURE ACTUATABLE VALVE ASSEMBLY

[75] Inventor: John M. Clarke, Chillicothe, Ill.

[73] Assignee: Caterpillar Inc., Peoria, Ill.

[21] Appl. No.: 23,832

[22] Filed: Feb. 23, 1993

[51] Int. Cl.[5] .......... F16K 31/14; F01L 9/02

[52] U.S. Cl. .......... 137/495; 123/90.12; 123/90.14

[58] Field of Search .......... 137/495; 123/90.12, 123/90.13, 90.14

[56] References Cited

U.S. PATENT DOCUMENTS

| | | | |
|---|---|---|---|
| 896,439 | 8/1908 | Criner | 123/90.14 |
| 1,430,505 | 9/1922 | Hinchman | 137/495 |
| 1,687,176 | 10/1928 | Olsen | 299/87 |
| 2,602,702 | 7/1952 | Kovach | 299/107.2 |
| 2,799,263 | 7/1957 | French | 123/139 |
| 3,126,911 | 3/1964 | Galley | 137/495 |
| 3,285,674 | 11/1966 | Eaton | 137/495 |
| 3,481,363 | 12/1969 | Ray | 137/495 |
| 3,960,171 | 6/1976 | Segrest et al. | 137/495 |
| 4,776,516 | 10/1988 | Klomp | 239/87 |
| 5,193,495 | 3/1993 | Wood, III | 123/90.14 |

FOREIGN PATENT DOCUMENTS

| | | | |
|---|---|---|---|
| 1385536 | 2/1975 | United Kingdom | 137/495 |

*Primary Examiner*—Tony M. Argenbright
*Assistant Examiner*—Weilun Lo
*Attorney, Agent, or Firm*—Frank L. Hart

[57] ABSTRACT

A bistable pneumatic valve assembly has a valve containing a flange and is adapted to be associated with a combustion chamber of an internal combustion engine. A control outlet opening of the valve assembly housing is opened for responsively causing the valve to both open and close for controlled passing of fluid from the valve assembly.

7 Claims, 2 Drawing Sheets

PRESSURE ACTUATABLE VALVE ASSEMBLY

TECHNICAL FIELD

This invention relates generally to a valve assembly which controllably passes a fluid in response to fluid pressures exerted on a valve of the valve assembly.

BACKGROUND ART

Various patents have described valve assemblies which are utilized for controllably passing fuel into the combustion chamber of an engine, for example. In these heretofore utilized valve assemblies, one or more springs are utilized for shifting or augmenting the shifting of a valve of the valve assembly.

As is known in the art, spring rates vary with usage and other control problems must be compensated for when springs are utilized. Furthermore, it is realized that if the springs of the assembly could be eliminated from the assembly, it would represent a savings of labor, time, and natural resources.

Examples of valve assemblies for controlling the passage of fuel to an engine are: U.S. Pat. No. 896,439, "Valve", which issued on Aug. 18, 1908 to J. J. Criner; U.S. Pat. No. 1,687,176, "Means for Injecting Liquid Fuel Into Internal Combustion Engines" which issued on Oct. 9, 1928 to S. D. Olsen; U.S. Pat. No. 2,602,702, "Injector and Pump", which issued on Jul. 8, 1952 to F. Kovach; U.S. Pat. No. 2,799,263, "Fuel Injection Apparatus", which issued on Jul. 16, 1957 to L. 0. French; and U.S. Pat. No. 4,776,516, "Air-Assist Fuel Injection Nozzle", which issued on Oct. 11, 1988 to E. D. Klomp.

The present invention is directed to overcoming one or more of the problems as set forth above.

DISCLOSURE OF THE INVENTION

In one aspect of the present invention, a valve assembly has a housing. The housing has first and second chambers, an inlet opening, a major outlet opening, and a control outlet opening. A valve of the valve assembly has a head, a stem, and a flange. The valve head has a surface facing in a first direction. The valve flange has first and second opposed surfaces with each first and second surface having a preselected surface portion. The valve flange is spaced from the valve head and positioned within the housing second chamber with the first surface of the flange and the valve head surface facing a common direction.

The valve is moveable between a first position at which the inlet opening is in communication with the major outlet opening and the second surface of the flange is in communication with the control outlet opening and a second position at which the major outlet opening is sealed by the valve head and the preselected portion of the second surface of the flange is sealed from communication with the minor outlet opening.

Means are associated with the second surface of the flange and the housing for defining the preselected second surface portion and sealing the preselected second surface portion of the flange from communication with the control outlet opening. Means is associated with one of the first surface of the flange and the housing for isolating and defining the preselected first surface portion of the flange at the first position of the valve. Means are provided for continuously communicating the valve head surface and the preselected portion of the second surface of the flange. Means are also provided for controllably opening and closing the housing control outlet and moving the valve between the first and second positions only in response to opening of the housing control outlet and resultant pressure changes acting on the valve in the operating condition of the valve assembly.

BEST MODE FOR CARRYING OUT THE INVENTION

As is well known in the art of fuel injection or valve mechanisms for controllably passing fuel into the combustion chambers of an engine, the fuel is pressurized and is controllably passed from a valve assembly or injector into its associated combustion chamber in response to the position of the combustion chamber cylinder. Control of the opening and closing of the valve of the valve assembly is triggered by various means such as a pulse of hydraulic pressure timed by mechanical or electronic means.

Figure 1:
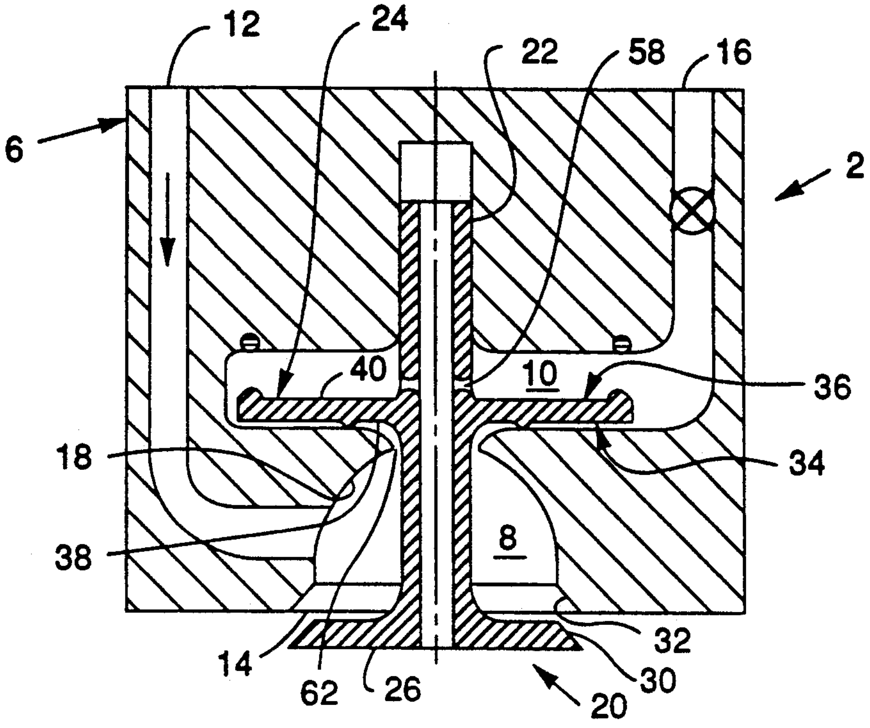
FIG. 1 is a sectional view of the valve assembly of this invention with the valve at the first or open position.

Referring to FIG. 1, the valve assembly 2 of this discovery can best be described as a bistable pneumatic valve. Operation of the valve assembly is entirely in response to pressure differences and therefore the assembly contains no other mechanical, electrical, or other means for augmenting movement of or moving the valve 4 of the valve assembly 2.

The valve assembly 2 has a housing 6 which has first and second chambers 8,10, an inlet opening 12 from a pressurized fuel source, a major outlet opening 14 into the combustion space, and a control outlet opening 16 to a low pressure. The first and second chambers 8,10 are defined by inner walls of the housing and a dividing wall 18. Both outlets 14,16, the inlet 12, and the first and second chambers 8,10 are in communication with one another.

The valve 2 has a head 20, a stem 22 connected to the head 20, and a flange 24 connected to the stem 22 and extending about the stem 22 and outwardly therefrom . The valve head 20 has a first surface 26 extending in a first direction and a sealing surface 30 extending about the edge of the valve and being matable with a sealing surface 32 of the major outlet opening 14 as is well known in the valve art.

The valve flange 24 has first and second opposed surfaces 34,36. Each flange surface 34,36 has a preselected surface portion 38,40, each of which are defined by hereafter described elements. The valve flange 24 is spaced from the valve head 20 and positioned within the second chamber 10 of the housing 6 with the first surface 34 of the flange 24 facing in a common direction as the surface 26 of the valve head 20.

Figure 2:
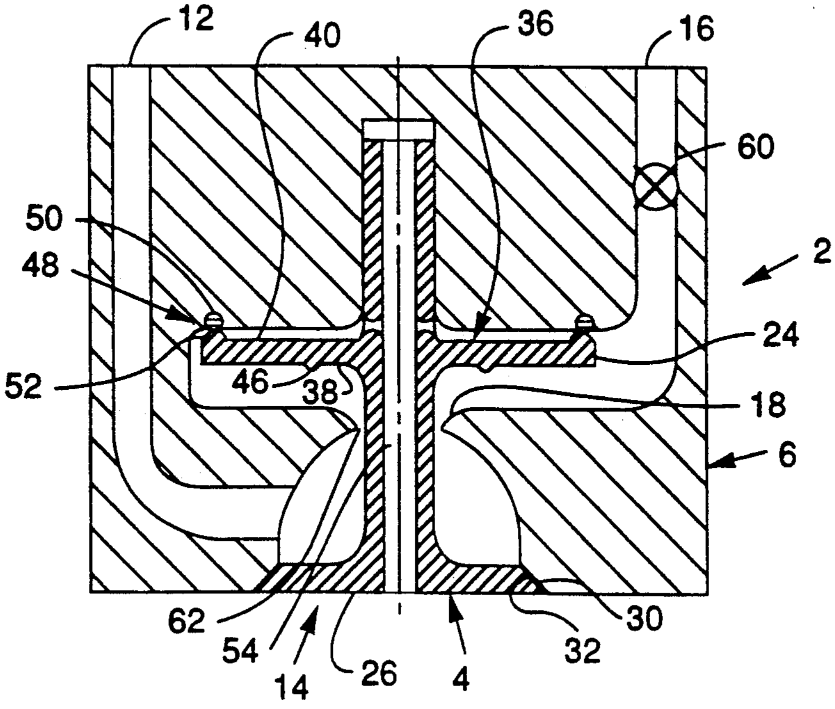
FIG. 2 is a sectional view of the valve assembly of this invention with the valve at the second or closed position.

The valve 4 is moveable relative to the housing 6 between first and second positions. At the first position, as shown in FIG. 1, the valve head sealing surface 30 is spaced from the housing sealing surface 32, the major outlet opening 14 is open and in communication with the housing inlet 12, and the second surface 36 of the flange 24 is in communication with the control outlet opening 16 of the housing 6. At the second position, as shown in FIG. 2, the valve head sealing surface 30 is in contact with the sealing surface 32 of the housing 6 and the major outlet opening 14 is sealed against the passage of fluid from the housing inlet opening 12, through the valve assembly 2, outwardly through the major outlet opening 14 and, for example, into a combustion chamber of an engine (not shown). At the second position of the valve 4, the preselected portion 40 of the second flange surface 36 is sealed from communication with the control outlet opening 16.

Means 46 are associated with one of the first surface 34 of the flange 24 and the housing 6 for isolating and defining the preselected first surface portion 38 of the flange 24. Means 46 is a ridge of ring configuration formed on one of the flange 24 and housing 6. The means 46 defines an area of preselected magnitude for purposes hereinafter described.

Means 48 preferably includes an elastomeric ring 50 connected to one of the flange 24 and housing 6 and a ridge 52 of ring configuration formed on the other of said flange 24 and housing 6. The means 48 defines an area of preselected magnitude 40 for purposes hereinafter described and seals the preselected flange portion 40 of the second surface 36 of the flange 24 from communication with the control outlet opening 16 at the second position of the valve 4.

Means 54 is provided for continuously communicating the valve head surface 26 and the preselected portion 40 of the second surface 36 of the flange 24, for purposes as hereinafter more fully described. Means 54 includes an opening which extends through the valve head 20, the valve stem 22 and opens onto the valve head surface 26 and the preselected portion 40 of the second surface 36 of the flange 24.

Means 60, for example a controlling valve, is positioned in the control outlet opening 16 of the housing 6 for controllably opening and closing the housing control outlet 16 for moving the valve 4 between the first and second positions only in response to opening of the housing control outlet 16 and permitting fluid to pass from valve housing 6 and generate resultant pressure changes acting on the valve 4.

The control valve 60, as is known in the art, is connected to measuring and actuating means (not shown) which control the opening and closing of the control valve 60 responsive to operating data received from the operating engine upon which installed.

As can be seen in the drawings, an annulus 62 is defined by the valve stem 22 and the housing dividing wall 18. This annulus 62 and the various heretofore mentioned elements of the valve define areas of preselected magnitude relative one to the others.

Referring to FIG. 1, the annulus 62 has a first area of preselected magnitude, the opening 58 through the valve stem 22 onto the second preselected area 40 of the second surface 36 of the flange 24 has a second area of preselected magnitude, and the opening of the control outlet 16 has a third area of preselected magnitude. In the embodiment of this invention, the third area is larger than the first and second areas.

Referring to FIG. 2, other elements of the valve assembly 2 likewise have areas of preselected relative magnitudes. The preselected portion 40 of the second surface 36 of the flange 24 has a area (A1) of preselected magnitude, the surface 26 of the valve head 20 has a fifth area (A2) of a preselected magnitude, and the preselected portion 38 of the first surface 34 of the flange 24 has a sixth area (A3) of preselected magnitude. In the embodiment of this invention, the area (A1) is greater than the fifth area (A2) and the fifth area (A2) is greater than the sixth area (A3).

INDUSTRIAL APPLICABILITY

As is known in the art, fuel of an engine for example, is controllably passed into the combustion chamber at specific intervals based upon operating conditions of the engine which are delivered to controlling apparatus which, in the present valve assembly, are actuated to open and close the valve 4. The pressure within the cylinder at the precise time at which it is desired to deliver fuel thereinto is always less than the pressure of the fuel within the valve assembly 2 thereby assuring the delivery of fuel into the cylinder.

In the operation of the valve assembly 2 of this invention, at the stable open position of FIG. 1, the force exerted by the pressurized fuel supply on the valve 4 is greater than the opposed force exerted on the preselected flange portion 38 of the valve 4 by the pressure within the cylinder. At the stable closed position of FIG. 2, the force exerted on the first surface 26 of the valve head 20 by the pressure within the cylinder is greater than the opposed force exerted on the valve 4 by the pressurized fuel supply.

Opening of the control outlet 16 causes the valve 4 to move from its stable position. If the valve is in a stable open position, as shown in FIG. 1, opening of the control outlet 16 reduces the pressure within the second chamber 10 and on the second surface 34 of the flange and the forces exerted on the valve 4 toward the closed position are greater than the forces in the opposed direction and the valve is moved toward the closed position. If the valve is in a stable closed position, as shown in FIG. 2, opening of the control outlet 16 reduces the pressure within both the first and second chambers 8,10 and the forces exerted on the valve toward the open position are greater than the forces in the opposed direction and the valve is moved toward the open position.

Figure 3:
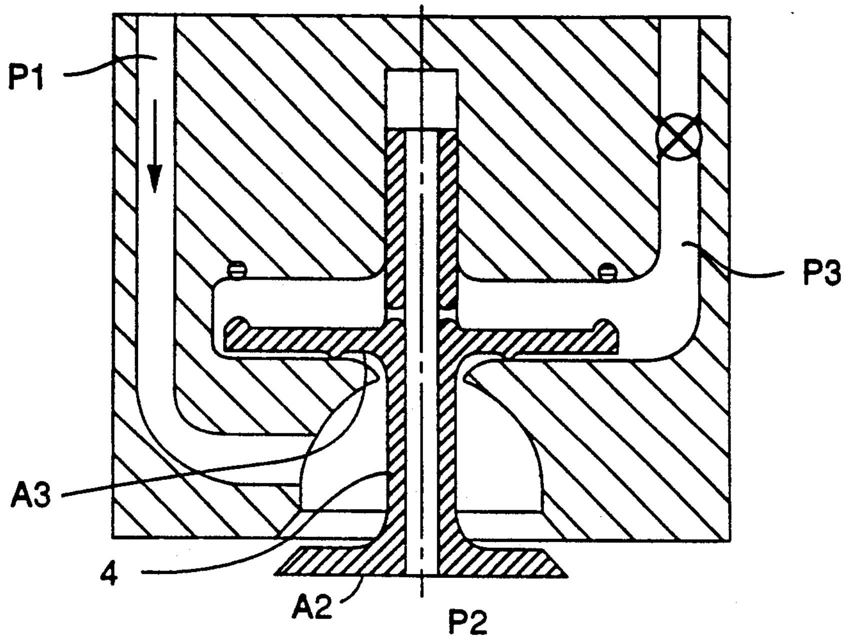
FIGS. 3 and 4 are similar to respective FIGS. 1 and 2.
Figure 4:
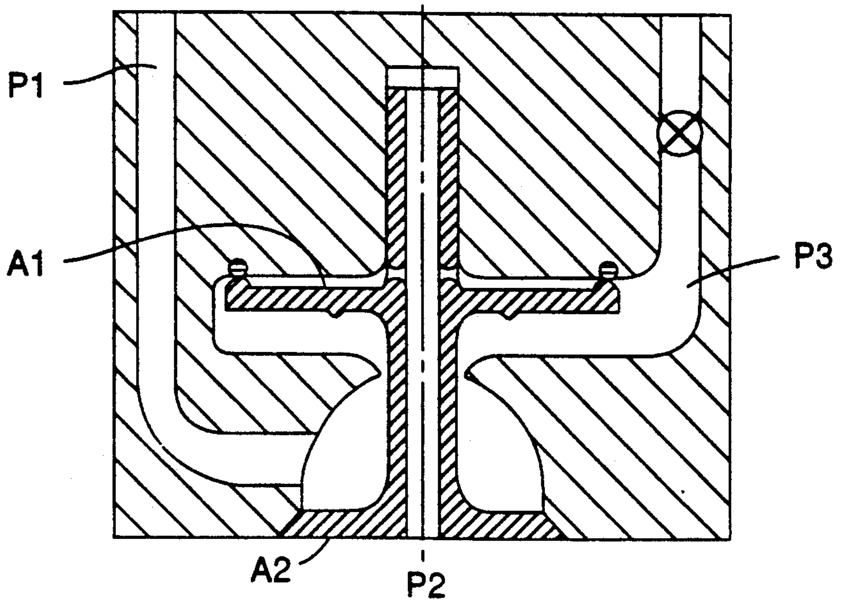

Description of the forces exerted on the valve and the sequencing of the valve can also be described mathematically with reference to FIG. 3 and 4 wherein the areas and pressures are described in different terms and displayed in differential areas and differential pressures.

At the Stable open position of FIG. 3, pressure P3 is equal to pressure P2. The force holding valve 4 open $=(P1-P2)(A2-A3)=$ greater than 0 . To close valve 4, the pressure P3 is reduced by opening the control outlet 16.

$$\begin{aligned}\text{Initial closing force} &= (P1-P3)(A3)-(P1-P2)(A2)\\ &= \text{greater than 0 when } P3 \text{ is}\\ &\quad\ \text{less than } P1-(A2/A3)(P1-P2)\end{aligned}$$

At the Stable closed position of FIG. 4, pressure P3 is equal to pressure P1. The force holding valve 4 closed $=(P1-P2)(A1-A2)=$ greater than 0. To open valve 4, the pressure P3 is reduced by opening the control outlet 16.

$$\begin{aligned}\text{Initial opening force} &= (P1-P2)(A2)+(P2-P3)(A1)\\ &= \text{greater than 0 when } P3 \text{ is}\\ &\quad\ \text{less than } P2+(A2/A1)(P1-P2)\end{aligned}$$

With the above description of the present invention, one skilled in the art can readily, without undue experimentation, determine the the area sizes for the operating conditions upon which the valve assembly of this invention will be used. It should also be understood that the valve assembly of this invention can be utilized for both liquid and gas mediums and that the invention is particularly advantageous for the use in fuel injection for an internal combustion engine.

Other aspects, objects and advantages of this invention can be obtained from a study of the drawings, the disclosure and the appended claims.

I claim:

1. A valve assembly, comprising:

a housing having first and second chambers, an inlet opening, a major outlet opening and a control outlet opening;

a valve having a head, a stem and a flange, said valve head having a surface facing a first direction, and said valve flange having first and second opposed surfaces with each first and second surface having a preselected surface portion, said valve flange being spaced from the valve head and positioned within the housing second chamber with the first surface of the flange and the valve head surface facing a common direction, said valve being moveable between a first position at which the inlet opening is in communication with the major outlet opening and the second surface of the flange is in communication with the control outlet opening, and a second position at which the major outlet opening is sealed by the valve head and the preselected portion of the second surface of the flange is sealed from communication with the control outlet opening;

means associated with the second surface of the flange and the housing for defining the preselected second surface portion and controllably sealing the preselected second surface portion of the flange from communication with the control outlet opening;

means associated with one of the first surface of the flange and the housing for isolating and defining the preselected first surface portion of the flange;

means for continuously communicating the valve head surface and the preselected portion of the second surface of the flange; and means for controllably opening and closing the housing control outlet and moving the valve between the first and second positions only in response to opening of the housing control outlet and resultant pressure changes acting on the valve in the operating condition of the valve assembly.

2. An apparatus, as set forth in claim 1, wherein walls of the valve head and the valve stem define an opening extending therethrough and opening onto the valve head surface and the preselected portion of the second surface of the flange and defining the means for continuously communicating the valve head surface with the preselected portion of the second surface of the flange.

3. An apparatus, as set forth in claim 1, wherein the area of the preselected portion of the second surface of the flange is greater than the area of the valve face.

4. An apparatus, as set forth in claim 1, wherein an annulus defined by the valve stem and the housing at a location between the housing chambers is of a preselected area "a-1", an opening of the valve stem in communication with the preselected portion of the second surface of the flange being of a preselected area "a-2", and the area "a-3" of the control outlet opening being greater than areas a-1 and a-2.

5. An apparatus, as set forth in claim 4, wherein the area "A1" of the preselected portion of the second surface of the flange sealed from communication with the control outlet opening at the second position of the valve is greater than the area "A2" of the valve head surface, and the valve head surface area A2 is greater than the area "A3" of the preselected portion of the first surface of the valve in communication with the annulus between the valve stem and the housing.

6. An apparatus, as set forth in claim 1, wherein the means for sealing is an elastomeric ring connected to one of the flange and housing and a circumferential ridge formed on the other of said flange and housing and being sealably contacting the elastomeric ring at the second position of the valve.

7. An apparatus, as set forth in claim 1, wherein the means for isolating and defining the preselected portion of the first surface of the flange is a circumferential ridge formed on one of the flange and housing.

* * * * *